United States Patent [19]

Futami et al.

[11] Patent Number: 4,743,822

[45] Date of Patent: May 10, 1988

[54] SERVO MOTOR CONTROL METHOD AND APPARATUS

[75] Inventors: Shigeru Futami, Ibaragi; Yasuhiko Kaku, Saitama; Yoichi Yamamoto, Fukuoka, all of Japan

[73] Assignee: Yaskawa Electric Mfg. Co., Ltd., Fukuoka, Japan

[21] Appl. No.: 898,562

[22] PCT Filed: Dec. 21, 1985

[86] PCT No.: PCT/JP85/00701

§ 371 Date: Oct. 10, 1986

§ 102(e) Date: Oct. 10, 1986

[87] PCT Pub. No.: WO86/03904

PCT Pub. Date: Jul. 3, 1986

[30] Foreign Application Priority Data

Dec. 22, 1984 [JP] Japan .................. 59-271552
Dec. 22, 1984 [JP] Japan .................. 59-271553
Dec. 22, 1984 [JP] Japan .................. 59-271554
Jan. 24, 1985 [JP] Japan .................. 60-012125

[51] Int. Cl.⁴ .............................. G05B 11/42
[52] U.S. Cl. ........................ 318/610; 318/609
[58] Field of Search ................... 318/610, 609

[56] References Cited

U.S. PATENT DOCUMENTS 3,998,409 12/1976 Pistiner ................... 318/610 X

Primary Examiner—William M. Shoop, Jr.
Assistant Examiner—Saul M. Bergmann
Attorney, Agent, or Firm—Jordan and Hamburg

[57] ABSTRACT

A servo motor control apparatus for a cutting machine comprises a position feedback loop, a speed feedback loop and a current feedback loop. A current command for the machine is preset to a voltage corresponding to a frictional torque when the motor starts rotation or changes rotating direction, in order to compensate for response lag of motor resulting from frictional torque. The response lag is improved and machining error is reduced by setting a value of a pertinent integral element in the controller comprising an integral element to zero. The sign of such value can be reversed at the moment that the motor operation start command or direction inversion command has changed to positive or negative from zero.

11 Claims, 19 Drawing Sheets

(a) ROTATION BEFORE STOPPAGE IS NEGATIVE (b) ROTATION BEFORE STOPPAGE IS POSITIVE

SERVO MOTOR CONTROL METHOD AND APPARATUS

TECHNICAL FIELD

The present invention relates to a servo motor control method and apparatus which drives a machining device for a machining works on the basis of the commands sent from a numerical control apparatus and particularly to the technology for improving delay of response at the initial rotation and inversion of rotating direction of servo motor.

BACKGROUND ART

As shown in FIG. 23, for example, a servo motor control apparatus comprising a positional feedback loop is generally provided with a speed feedback loop for controlling a speed of revolution of motor 10 and a current feedback loop for controlling a current of motor 10, in addition to a positional feedback loop for controlling position of revolution of motor 10 or position of a mechanical movable part (not shown). In the current feedback loop, control is carried out so that deviation $\Delta I$ between a motor current $I_d$ detected by a resistor 11 and a current command value $I_s$ sent from a proportional integral controller 12 becomes zero, while in the speed feedback loop, deviation (Ve) between a motor speed $v_d$ detected by speed detector such as a tachometer and a speed command value $V_s$ sent from D/A converter 14 becomes zero. Finally, the position of motor is controlled by a positional feedback loop so that difference between position of motor $e_d$ detected by position detector 15 such as a resolver or linearscale, etc. and a position command value $e_s$ given from a command pulse generating circuit 16 becomes zero. In FIG. 23, 17 is amplifier; 18a–18c are adders.

FIG. 24 is an electrical circuit which indicates a conventional structure including an adder 18b, a proportional integral controller 12 and an adder 18c shown in FIG. 23. An operational amplifier $Q_1$, resistors $R_1$–$R_4$ and a capacitor $C_1$ form an adder 18b and a proportional integral controller 12, while an operational amplifier $Q_2$ and resistors $R_5$–$R_8$ form an adder 18c.

The relationship between motor current $I_d$, a motor speed command $V_s$ and motor speed $V_d$ in a conventional servo motor control apparatus having the structure shown in FIG. 23, when the rotating direction of motor is reversed, can be indicated, for example, as the curves $30v_r$, $31v$ and $32i$ of FIG. 25, where motor current $I_d$, motor speed command $V_s$ and motor speed $V_d$ are plotted on the vertical axis and the time t on the horizontal axis with the direction inversion command input time located at the origin. Here, $I_o$ is a value of friction torque of the machine converted in terms of a motor current. In this figure, a speed command is reduced with a constant deceleration from the positive to negative direction. As will be understood from this figure, when a speed command is input in the opposite direction when t=0, a motor current $I_d$ indicated by a curve $32i$ gradually reduces but a motor speed $V_d$ indicated by a curve $31v$ is zero until the motor current $I_d$ exceeds $-I_o$ and the motor starts to rotate when a motor current $I_d$ exceeds $-I_o$. Namely, a time lag $T_1$ is generated during the period from input of speed command in the opposite direction until start of motor in the reverse direction.

Such time lag naturally appears as a working error in numerical control. More specific, as shown in FIG. 26, the cutting should be done along a true circle shown by a curve 40 through distribution of command pulses of a true circle but actually such discrepancy occurs that the actual shape of work to be cut shows extruded portions as shown by the curve 41 at the quadrant exchange regions of circular cutting due to the delay of response generated when the rotating direction is inversed.

This phenomenon is further explained below. In FIG. 26, in the section I, only the X axis changes and Y axis does not change and the maximum speed is obtained. In the section II, the Y axis also changes but a true circle is not obtained. In the section III, both X and Y axes change and a true circle can be obtained. When the Y axis changes in the one direction from the stationary condition, such timing is delayed and thereby said sections I, II can be generated and extruded portions can be formed when the machining error from a true circle is considered.

In current numerical control, the pulse distibution of straight line and circle is used and therefore a problem rises in circular cutting. In addition to circular cutting, the same problem also occurs in such a locus where direction of speed command of another shaft is reversed while the sign of the speed command of a shaft is constant, namely a temporary stop occurs, for example, in the contour control of parabolic locus.

As a method for improving such discrepancy, a method disclosed in the Japanese Patent Provisional Publication No. 57-71282 has been proposed.

This method is intended to enhance control accuracy through compensation for response lag of motor caused by a friction torque when the motor changes the rotating direction. Considering that a voltage determining a current command value when the direction inversion signal is input is proportional to a friction torque, a compensating voltage which is almost equal to such voltage in the absolute value and has polarity opposed to it is generated and this compensating voltage quickly presets, immediately after the direction inversion signal is input, a voltage forming said command current value to a voltage corresponding to a frictional torque.

This method will then be explained concretely. FIG. 27 shows an electrical circuit based on such improvement and the like symbols indicate the like elements in FIG. 24 and FIG. 27. In FIG. 27, 50 is a compensating voltage generating circuit; 51 is response compensating circuit; $IN_2$ is an input terminal to which peak value set signal $S_1$ is applied; $IN_3$ is an input terminal to which a friction torque compensating signal $S_2$ is an applied; OUT is output terminal from which a current command value $I_s$ is applied to the adder 18c in FIG. 23; $Q_4$–$Q_6$ are operational amplifiers of the polarities shown in the figure; $SW_1$, $SW_2$ are switching elements; $R_{10}$–$R_{18}$ are resistors; $C_2$ is a capacitor. Moreover, $-V_s$ is an output obtained when $V_s$ is applied to an inverting amplifier of $-1$.

This circuit is different from a conventional apparatus shown in FIG. 24 in that the compensating voltage generating circuit 50 and the response compensating circuit 51 are provided.

The compensating voltage generating circuit 50 detects when a motor rotating direction inversion signal is output from a command pulse generating circuit 16 in the numerical control apparatus, a voltage which determines a current command value at this time, namely an output voltage (hereinafter referred to as a command voltage) of a proportional integral controller 12 and generates a compensating voltage $V_c$ which is almost equal to such command voltage in the absolute value and has the polarity opposed to it. This circuit is composed of an integral circuit consisting of a resistor $R_{14}$ and a capacitor $C_2$, a switching element $SW_1$ which controls operation of such integral circuit and a polarity inversion circuit consisting of the operational amplifiers $Q_4$, $Q_5$ and resistors $R_{13}$, $R_{15}$, $R_{17}$.

Moreover, the response compensating circuit 51 operates so that a command voltage is quickly set almost equal to a compensating voltage immediately after the motor rotating direction inversion command signal is input, and is composed of an operational amplifier $Q_6$ which amplifies difference between command voltage and compensating voltage $V_c$ and a switching element $SW_2$ which feeds back $\Delta V$ which is an output of such amplifier to the input side of proportional integral controller 12.

FIG. 28 shows a diagram illustrating signal waveforms at respective points when the apparatus of FIG. 27 operates. With reference to the same figure, opertions of the apparatus of FIG. 27 are explained in detail.

When a direction inversion signal like FIG. 28(a) is output, for example, from a command pulse generating circuit 23, a peak value set signal $S_1$ in duration $T_2$, of which rising edge almost matches the rising part of direction inversion signal shown as FIG. 28(b), is generated by a control circuit (not shown).

This peak value set signal $S_1$ is applied to the switching element $SW_1$ of the compensating voltage generating circuit 50, turning ON this switching element $SW_1$ only during the time $T_2$. As a result, a capacitor $C_2$ is charged by a command voltage at that time and a compensating voltage $V_c$ which is almost equal to the command voltage in the absolute value and is opposed thereto in the polarity appears at the output of operational amplifier $Q_5$ with the time constant almost equal to $t=C_2 \times R_{14}$. In case the time width (duration) $T_2$ of peak value set signal $S_1$ is set to about 2t 3t, a compensating voltage which is almost equal to the command voltage in the absolute value and is opposed thereto in the polarity can be obtained, for example, as shown in FIG. 28(c) from the compensating voltage generating circuit 50 and this compensating voltage is also held even after the switching element $SW_1$ turns OFF.

Next, a frictional torque compensating signal $S_2$ having duration $T_3$ which rises in synchronization with fall of the peak value set signal $S_1$ as shown in FIG. 28 (d) is generated by a control circuit not shown and it is applied to the switching element $SW_2$ of response compensating circuit 51, turning it on. As a result, the command voltage is controlled to become almost equal to the compensating voltage $V_c$ with the output of the operational amplifier $Q_6$ which amplifies a difference between the command voltage and compensating voltage $V_c$ and thereby the command voltage immediately falls as shown in FIG. 28(e) (however, rises immediately in the case of opposed direction inversion). Here, compensation speed of the command voltage can be freely changed by adjusting the value of resistor $R_{12}$.

As explained above, according to the method proposed by said prior art, a motor current $I_d$ exceeds the opposite friction torque $I_o$ quicker than the conventional circuit with operation of the compensating function and the motor speed also rises quicker as much and thereby the time lag due to inversion of rotating direction of motor can be improved remarkably. In addition, time lag due to the inversion of rotating direction can be changed freely by adjusting a value of resistor $R_{12}$.

As explained above, the apparatus disclosed in the Japanese Patent Provisional Publication No. 57-71282 is certainly capable of improving a time lag of a servo system due to a frictional torque for the conventional servo motor control apparatus but also provides following disadvantages.

(1) A frictional torque cannot be compensated during the time $T_2$ for setting a peak value to the compensating voltage generating circuit 50 and time lag of the servo system due to frictional torque cannot be improved.

(2) During the period between time $T_2$ and $T_2+T_3$ shown in FIG. 28, an output $\Delta V$ of an operational amplifier $Q_6$ of FIG. 27 becomes equal, while the speed command value changes to positive from negative, to a negative saturation voltage $-V_{sat}$ (or a positive saturation voltage $+V_{sat}$ in case the speed command changes to negative from positive). The time of direction inversion is considered as $t=0$ and the successive output waveforms of operational amplifiers $Q_2$, $Q_6$ are shown in FIG. 29. Since $T_2$, $T_3$ are actually selected to be very short periods, it is possible to approximately assume that $V_s=0$, $V_d=0$ respectively until the time near $t=T_2+T_3$ from $t=0$. When $t=T_2$, $SW_2$ closes and a saturation voltage $+V_{sat}$ is applied to $Q_2$, since $Q_2$ is a proportional integral controller, $I_2$ changes like a step as much as $I_p$ due to the operation of proportional controller at $t=T_2$ and thereafter $I_s$ changes at a constant gradient determined by $-V_{sat}$ and integral time constant due to the opertion of integral controller. At the moment when $I_s=-I_o$, namely when $t=T_2+T_3$, $SW_2$ is open and an input of $Q_2$ becomes zero. At this time, however, since a curent command value $I_p$ due to the operation of proportional controller momentarily disappears, $I_s$ immediately after $t=T_2+T_3$ becomes equal to $-I_o+I_p$ but does not become equal to $-I_o$.

Namely, when friction during transfer to the positive (negative) direction at a certain position is $I_o$ (in terms of a motor current), friction during transfer in the opposite direction at the area very near to such position can be assumed as $-I_o$. Therefore, it is ideal for compensation of friction when the rotating direction is inversed to change momentarily the current command value from $I_o$ to $-I_o$. However, in the method of Japanese Patent Provisional Publication No. 57-71282, $I_s$ changes to $-I_o+I_p$ and compensation of frictional torque becomes insufficient as much as $I_p$.

Accordingly, the method of Japanese Patent Provisional Publication No. 57-71282 cannot perfectly compensate for the frictional torque. Imperfect integral can also be attempted by inserting in parallel a resistor with a capacitor $C_1$ in FIG. 27, but since such resistance value is actually selected to be a considerably large value, such content is also established in this case. Meanwhile, a small value cannot bring about an excellent characteristic for the control of speed system itself.

(3) Said patent does not refer to a logic circuit for switching $SW_2$. The closing timing is obvious as $t=T_2$ but the opening timing must be set to the timing where an output ($\Delta V$) of $Q_6$ changes. However, since an output of $Q_6$ changes to $+V_{sat}$ from $-V_{sat}$ or to $-V_{sat}$ from $+V_{sat}$ depending on positive or negative voltage being held by $Q_4$, some logic circuits are necessary for seizing the timing of such change.

(4) Although it may be repetition of items (1) and (2), the method of said patent 57-71282 requires the time, total of $T_2+T_3$ ($T_2$: required until $I_o$ is set to the compensating voltage circuit; $T_3$: required until the response compensating circuit operates and a current command value $I_s$ becomes equal to $I_o$, which is actually a little longer than $T_3$ as explained in item (2)), until the frictional torque is compensated.

Moreover, the relationship among a motor current $I_d$ at the initial condition, motor speed command $V_s$ and motor speed $V_d$ in the conventional servo motor control apparatus having the structure shown in FIG. 23 can be indicated, for example, as FIG. 33 (a),(b) depending on the preceding positive or negative rotations before stoppage, where motor current $I_d$, motor speed command $V_s$ and motor speed $V_d$ are plotted on the vertical axis, while time t on the horizontal axis with the direction inversion command input time located at the origin. The curves $30v_r$, $31v_d$, $32i_d$ indicated by (a1), (b1), (a2), (b2), (a3), (b3) respectively represent motor speed command, motor speed and motor current. However, a servo motor is assumed as to rotate in accordance with a current command $I_s$ and $I_s$ is omitted. $I_o$ is a frictional torque of machine and a torque corresponding to the external works; $I_1$ is static frictional torque of machine; $I_2$ is a frictional torque where a torque corresponding to external work and acceleration torque are respectively converted in terms of a motor current. In the case of example shown in the figure, a motor rotation command output starts in the positive direction. FIG. 33(a) indicates the case where rotation before stoppage is negative, while FIG. 33 (b) the case where rotation before stoppage is positive.

Next, FIG. 25 is an example where the motor rotating direction is inversed in case the acceleration and deceleration torques can be disregarded. Each symbol is the same as that in FIG. 33 and a speed command is reduced at a constant acceleration to negative from positive direction.

As is understood from FIG. 33, when a speed command is input at t=0, a motor current $I_d$ indicated by a curve $32i_d$ increases gradually and a motor speed vd indicated by the curve $31v_d$ is zero but vibrates until said motor current reaches $I_0$. When it reaches $I_o$, the motor speed $v_d$ starts rotation depending on the speed command $v_s$. Namely, even when the servo system shown in FIG. 23 is stable, the motor vibrates at the time of starting rotation and some time lag is generated until the motor starts rotation.

Such time lag and vibration are naturally appearing as the machining error in numerical control. More specific, the following discrepancy is generated, namely, since cutting is started, for example, after eliminating the vibration shown in FIG. 34, dwelling of a constant time is required, or as shown in FIG. 26, cutting should be done along a true circle shown in FIG. 40 through distibution of command pulse trains of true circle but the shape of actual work has extruded portions as shown by a curve 41 at the quadrant changing portion of circular cutting because of a response lag when the rotating direction is inversed. A straight line $e_s$ in FIG. 34 indicates a position command, while a curve $e_d$ indicates a position of actual motor or movable part of machine.

The present invention is intended to solve the problems of a conventional control circuit shown in FIG. 24 explained above and the method proposed in the Japanese Patent Provisional Publication No. 57-71282 shown in FIG. 27. It is the primary object of the present invention to enhance control accuracy by compensating for response lag of the motor caused by a frictional torque when the motor rotating direction is reversed. It is the second object of the present invention to apply a motor control conforming to the primary object to a digital speed loop. Moreover, it is the third object of the present invention to enhance control accuracy by reducing response lag of the motor caused by frictional torque when the motor rotating direction is reversed. It is the fourth object of the present invention to enhance control accuracy by compensating for vibration and response lag of the motor caused by a frictional torque, etc. when the motor starts to rotate or motor rotating direction is reversed. Moreover, it is the fifth object of the present invention to apply the motor control conforming to said fourth object to the digital speed loop.

DISCLOSURE OF INVENTION

According to the present invention, the means for solving such disadvantages of the prior art can be attained by reversely connecting to an integral capacitor immediately after the rotating starts or direction reversing signal is input and a current command value is momentarily set to a voltage corresponding to a frictional torque, or the integral capacitor is momentarily charged in the motor rotating direction with a charge corresponding to a sum of a frictional torque, a torque corresponding to external work and an acceleration torque, utilizing that a voltage determining a current command value when rotation starts and a direction reversing signal is input is equal to a voltage which is proportional or corresponds to a sum of a frictional torque, a torque corresponding to external work and an acceleration torque, and in this case since speed command and a motor speed are almost zero, a voltage determining a current command value is equal to a voltage across the integral capacitor.

Moreover, in case the digital speed loop is provided, the means of the present invention can be achieved by setting the integral item of the controller to a prescribed value at the timing mentional above.

BEST MODE FOR CARRYING OUT THE INVENTION

Figure 1:
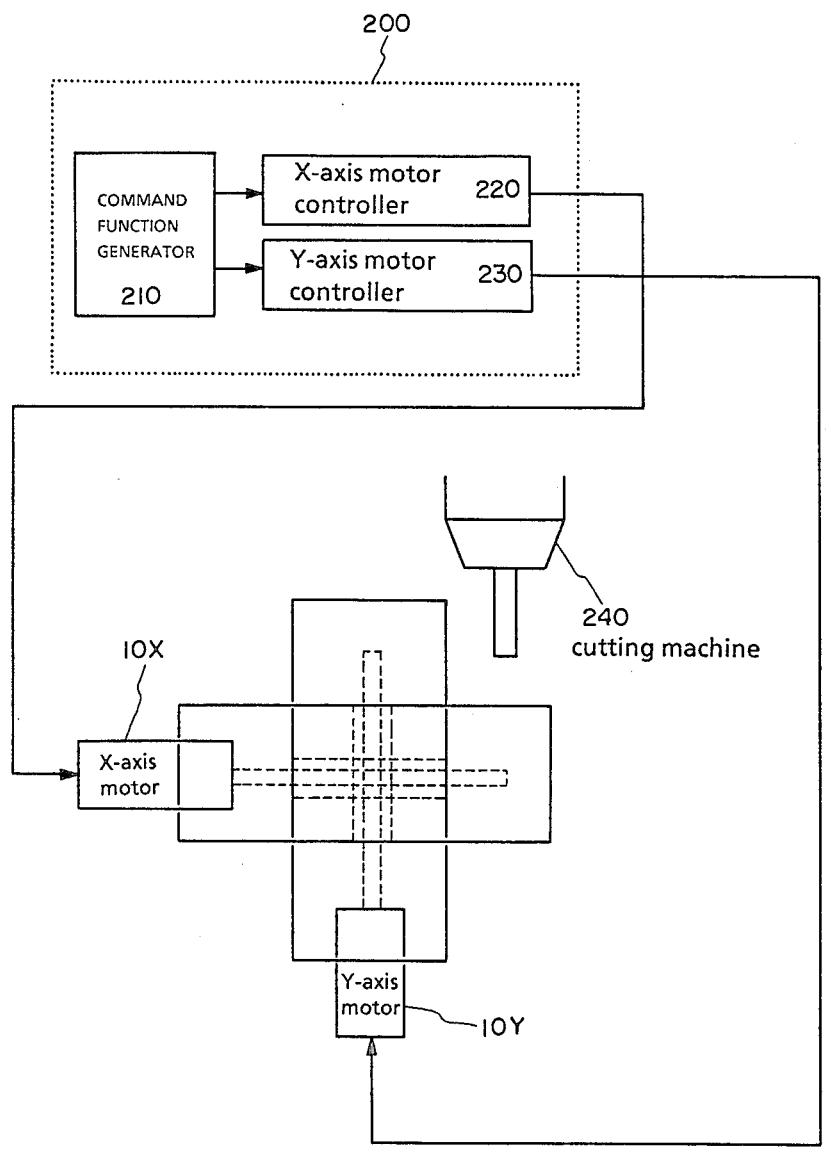
FIG. 1 is a block diagram of a control apparatus to which the present invention is implemented.

The present invention is concretely explained hereunder with reference to the embodiments thereof. FIG. 1 is an example, for example, of 2-axes X-Y table control apparatus for implementing the present invention. In this figure, 200 denotes a numerical control appartus, 210 is a command function generator, 220 is an X-axis motor controller, 230 is an Y-axis motor controller, 240 is a cutting machine, 10X is an X-axis motor, 10Y is an Y-axis motor.

Figure 2:
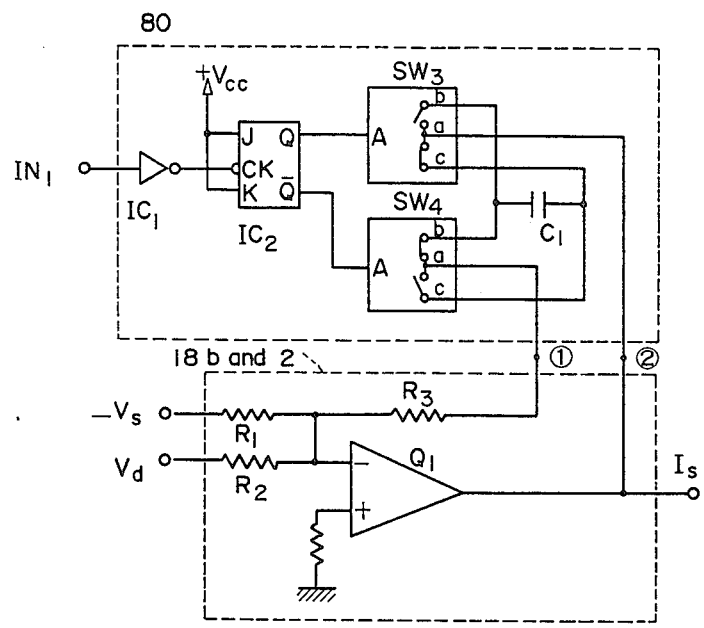
FIG. 2 is a circuti diagram illustrating a structure of an embodiment for achieving the first object of the present invention.

FIG. 2 is an electrical circuit of the essential part illustrating the structure of the appartus of the embodiment achieving said first object of the present invention. The same symbols as those in FIG. 24 denote the same elements. In FIG. 2, 80 denotes an integral capacitor connection inversion circuit, $In_1$ is an input terminal to which the direction inversion signal pulse is applied. The apparatus of this embodiment is different from the conventional appartus shown in FIG. 24 in that an integral capacitor connection inversion circuit 80 is provided.

The integral capacitor connection inversion circuit 80 momentarily reverses the connection of the integral capacitor $C_1$ when the motor rotating direction inversion signal is output from the command function generator 210 of the numerical control appartus 200 and is composed of a NOT gate $IC_1$, a J-K flip-flop $IC_2$ and transfer type analog switches $SW_3$, $SW_4$.

Figure 3:
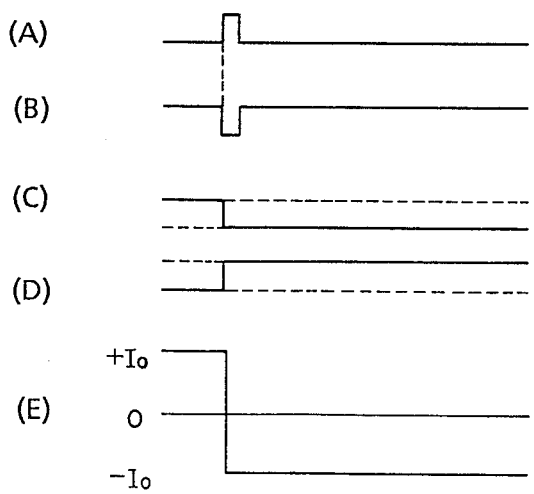
FIG. 3 shows waveforms for explaining operations of FIG. 2.

FIG. 3 shows waveforms at each point in such as case that the circuit shown in FIG. 2 operates. Operations of circuit shown in FIG. 2 are explained in detail with reference to FIG. 3.

When a direction inversion signal pulse which causes the rising edge to be inverted is generated as shown in FIG. 3(A) from the command function generator, the signal is inverted by the NOT gate $IC_1$ as shown in FIG. 3(B). When this signal is input to the CK terminal of J-K flip-flop $IC_2$, the outputs Q and $\overline{Q}$ of $IC_2$ are inversed (H→L, L→H, where L: low level, H: high level) as shown in FIG. 3(C) and (D). When the signal H is applied to the input terminal A, the analog switches $SW_3$ and $SW_4$ close between the contacts a–c and open between the contact a–b. If it is assumed that the output Q is H while $\overline{Q}$ is L before the pulse of FIG. 3(A) is applied, $SW_3$ where the contact a–c close while the contacts a–b open and $SW_4$ where the contact a–c open while the contacts a–b close respectively causes $SW_3$ where the SW contacts a–c to open and a–b to close while $SW_4$ where the contacts a–c to close and a–b to open, upon inversion of the outputs Q and $\overline{Q}$ of FIG. 3(C), (D). Thereby, the integral capacitor $C_1$ is momentarily reversed in connection with the terminals 1 and 2 of FIG. 2. When the motor direction is reversed, since both speed command $V_s$ and the detected motor speed $V_d$ are zero, a current command $I_s$ which has been $+I_o$ before input of direction inversion signal pulse momentarily becomes $-I_o$ in synchronization with the rising edge of the direction inversion signal pulse, thus compensating for a frictional torque resulting from reversal of direction.

Hereinafter, several applicable modifications are explained.

Figure 24:
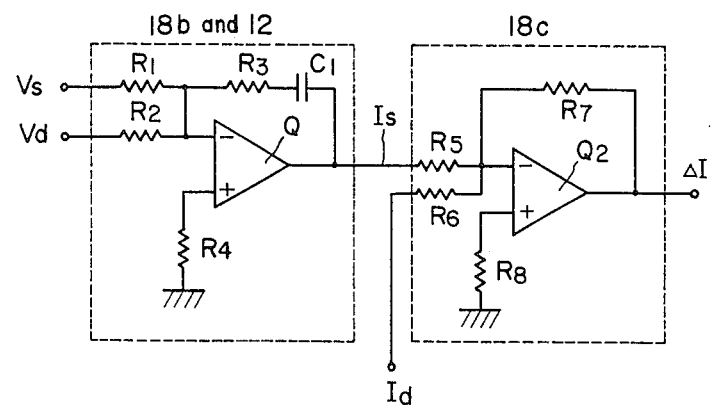
FIG. 24 is an electrical circuit illustrating the conventional structure of the proportional integrator.
Figure 25:
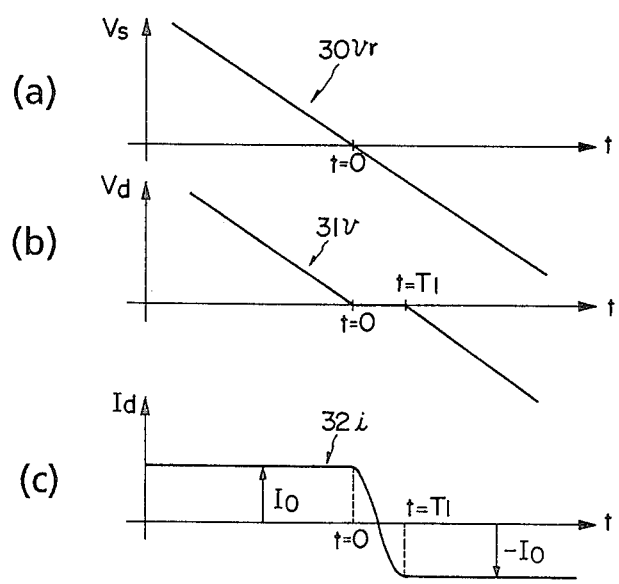
FIG. 25 shows the conventional control operation waveforms.

In some cases a resistor is inserted in parallel with the integral capacitor $C_1$ of FIG. 24, it does not result in any problem because the above explanation is directly adapted in this case.

It is also possible to use a transfer type reed switch in place of the transfer type analog switches $SW_3$, $SW_4$.

Figure 4:
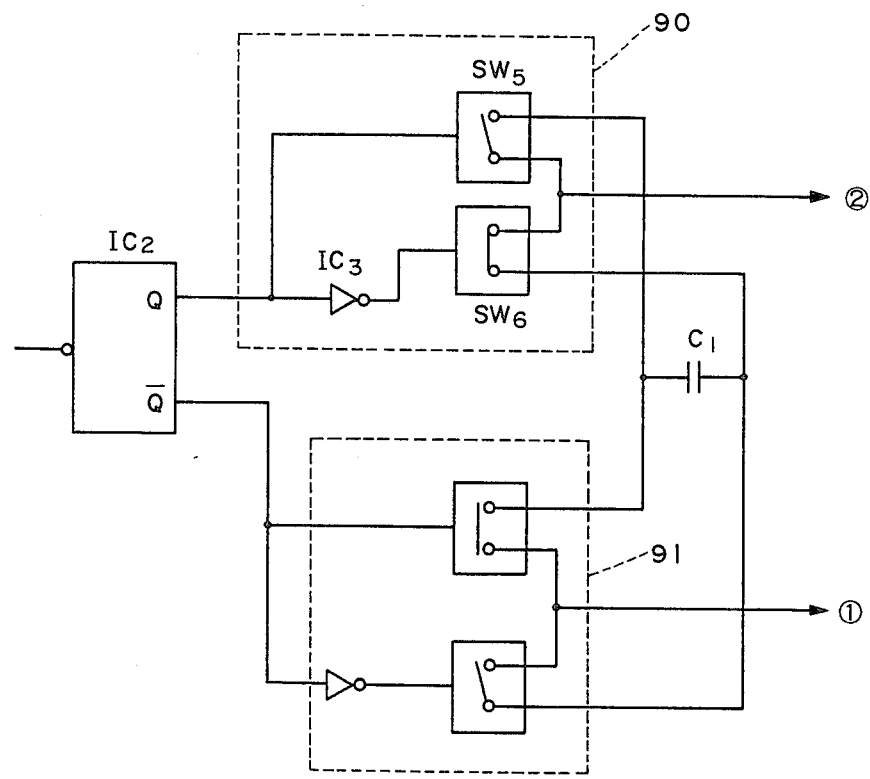
FIGS. 4-9 are circuit diagrams illustrating other embodiments of the present invention.

Moreover, two units of one-make type analog switch or reed switch can be used as shown in FIG. 4, in place of one transfer type analog switch or reed switch. In FIG. 4, $IC_3$ is a NOT gate, while $SW_5$, $SW_6$ are one-make type analog switch or reed switch. Namely, the block 90 shown in FIG. 4 corresponds to $SW_3$ in FIG. 2 and the block 91 to $SW_4$ of FIG. 2.

Figure 5:
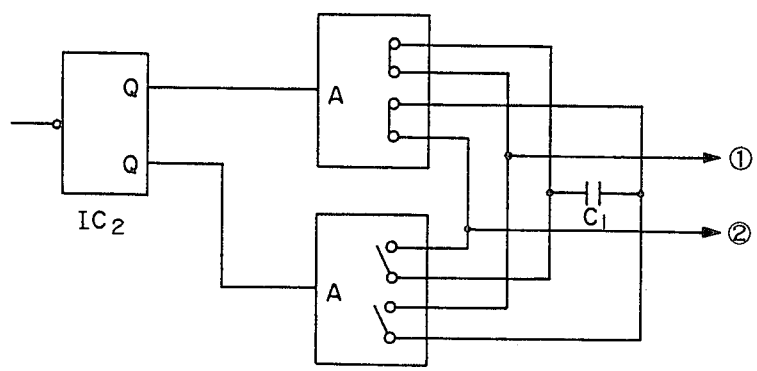

In addition, two units of two-make type analog switch or reed switch may be used as shown in FIG. 5 in place of two transfer type analog switches or reed switches.

Usually a switch shows a certain lag of operation and the closing time of switch is generally different from the opening time. In case the switch closing time is quicker than the opening time, there is a danger in the circuit of FIG. 2 that the integral capacitor is transitionally discharged by short circuiting. In such a case, a resistor $R_a$ having a selected value is inserted as shown in FIG. 6 so that a time constant $C_1R_a$ becomes sufficiently larger than the short-circuit time.

In case the opening time of the switch is quicker than the closing time, the terminals 1 and 2 in FIG. 2 open transitionally and an abnormal voltage may be generated momentarily due to a high opening gain of the operational amplifier $Q_1$. In this case, therefore, a capacitor $C_2$ having sufficiently smaller capacitance value than $C_1$ is inserted between the terminal 1 and 2 or a high resistance $R_b$ is inserted between the terminal 1 and 2 as shown in FIG. 8.

Figure 6:
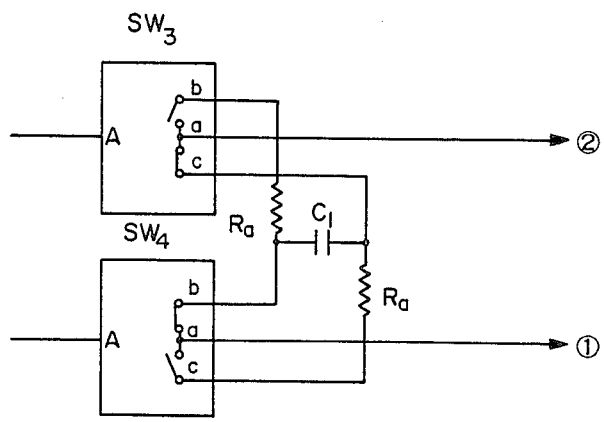
Figure 7:
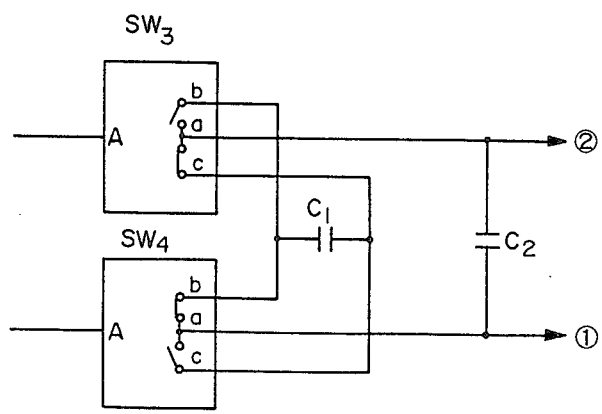
Figure 8:
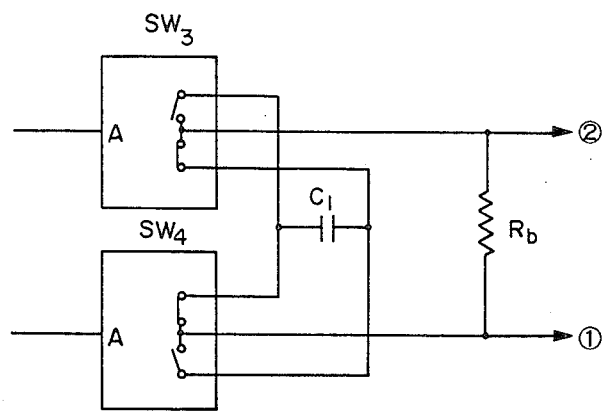
Figure 9:
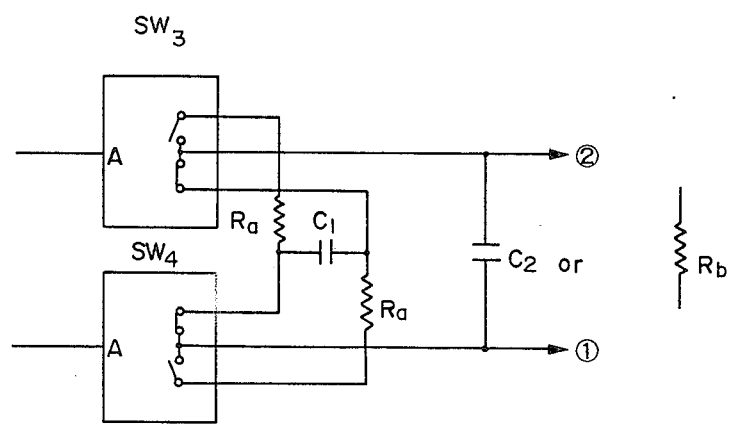

If the switching opening and closing times are unknown or not contant, the measures indicated in FIG. 6 and FIG. 7 or in FIG. 8 is preferably provided in parallel as shown in FIG. 9.

Figure 10:
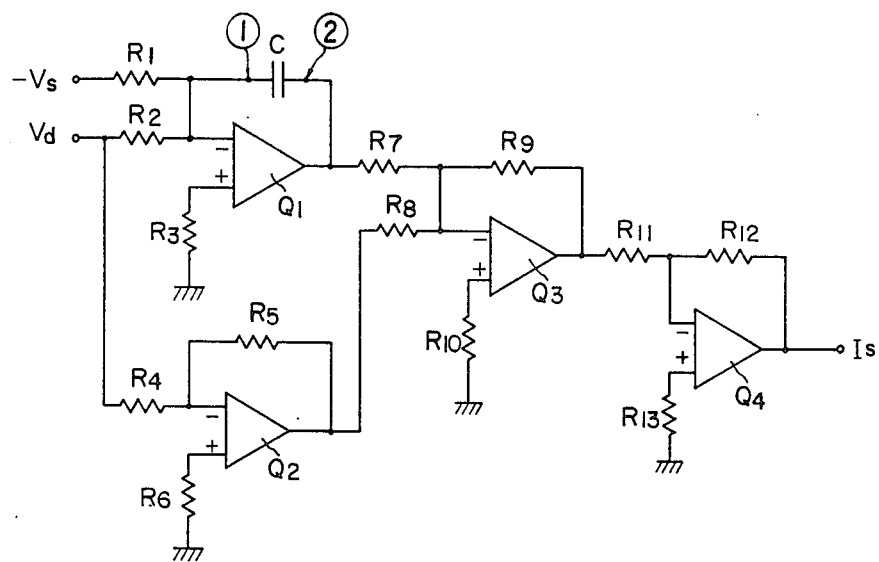
FIG. 10 is a circuit diagram of an integral proportional controller.
Figure 11:
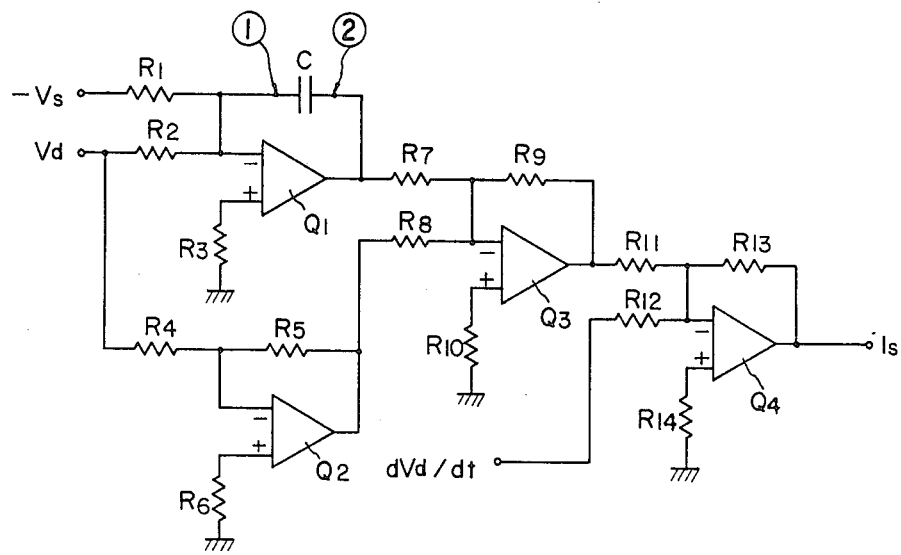
FIG. 11 is a circuit diagram of an integral proportional differential controller.
Figure 12:
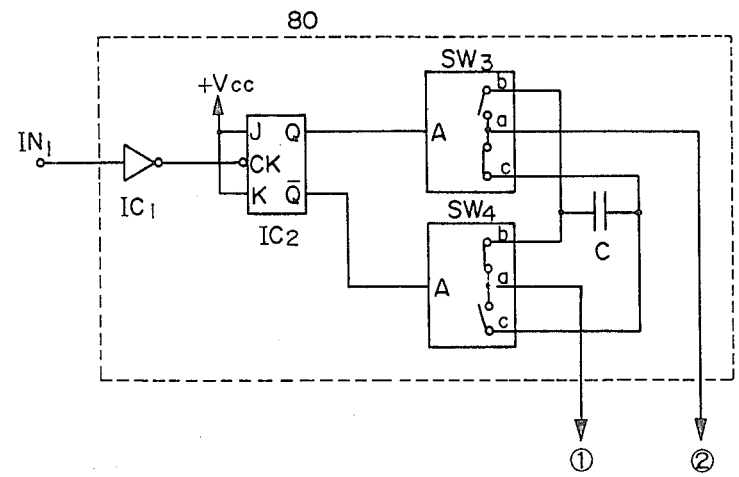
FIG. 12 is a circuit diagram in such a case as implementing the present invention to FIG. 10 and FIG. 11.

FIG. 10 and FIG. 11 respectively show the structures of the integral proportional controller and integral proportional differential controller. The present invention can also be applied to these control systems as in the case of the proportional integral controller as explained above with the similar effect by separating the integral capacitor C shown in such figures and then connecting a capacitor polarity inversion circuit shown in FIG. 12 to the terminals 1 and 2.

In case the motor rotating direction inversion signal cannot be obtained from the command function generator, the moment of polarity judgment of speed command $V_s$ is preferably used as the equivalent to the motor rotating direction inversion signal pulse.

As explained above, in the embodiments of the present invention shown in FIG. 2–FIG. 12, a current command voltage which is equal in the absolute value and is opposed in polarity to a command voltage which detemines a current command value at the moment when the motor rotating direction inversion signal pulse is input from the command function generator is generated and the command voltage corresponding to a frictional torque is compensated momentarily, thereby remarkably improving delay of servo system due to frictional torque.

Moreover, the circuit structure is simplified as compared with the method disclosed in the Japanese Patent Provisional Publication No. 57-71282 and response lag can be reduced theoretically to zero.

Figure 26:
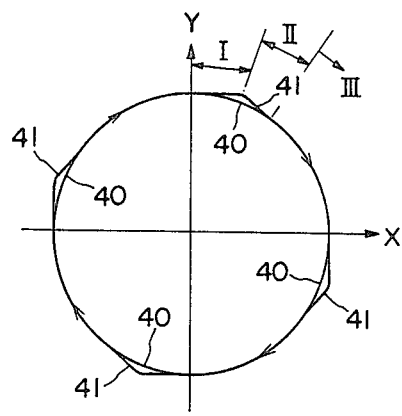
FIG. 26 is an explanatory view of illustrating tracking ocndition due to response lag.
Figure 27:
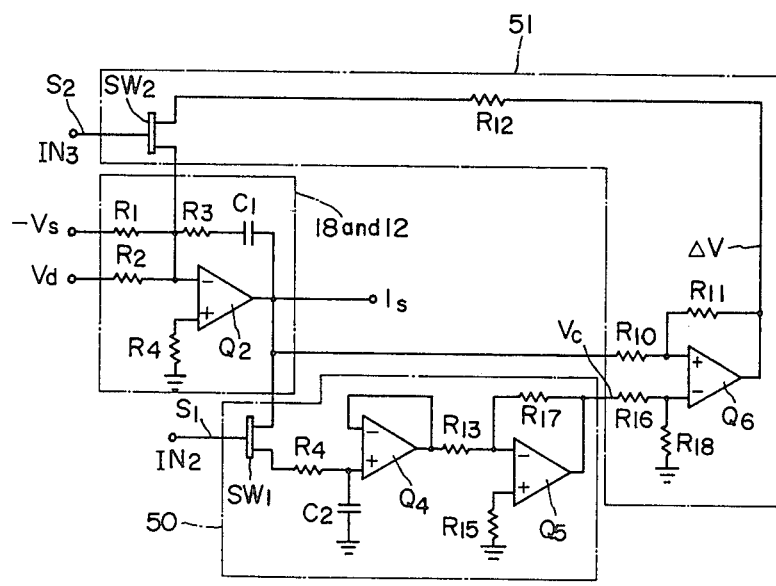
FIG. 27 is a circuit diagram illustrating an improved structure of the conventional structure.
Figure 28:
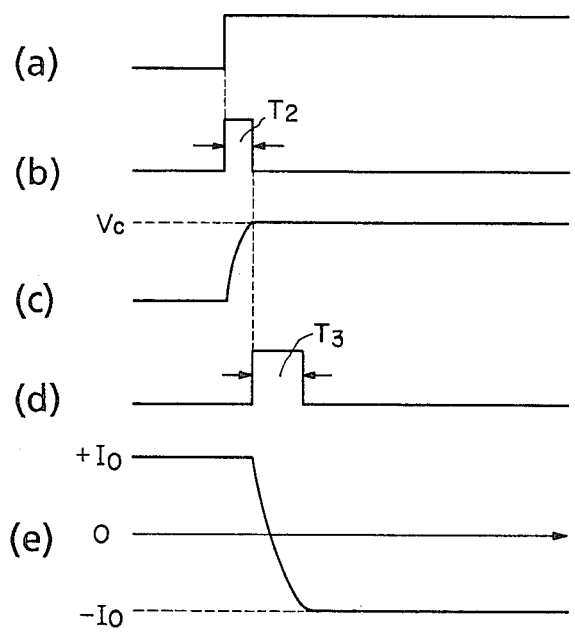
FIG. 28 shows operation waveforms.
Figure 29:
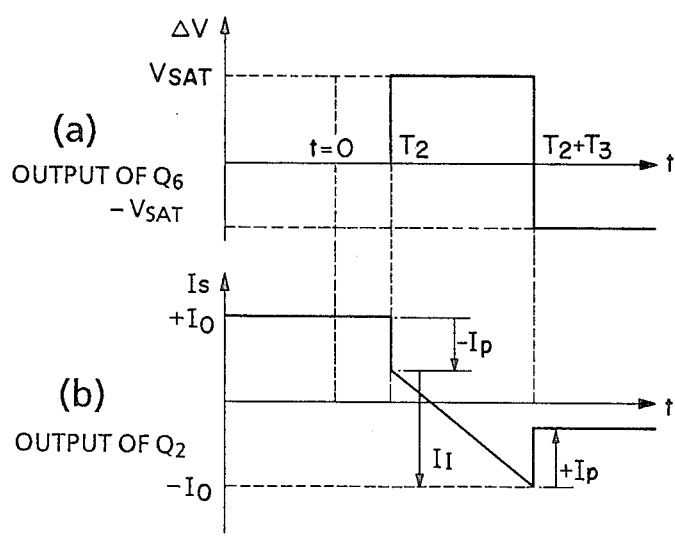
FIG. 29 shows waveforms indicating response characteristic.

Therefore, application of the present invention to the servo motor control apparatus of a numerical control appartus eliminates machining error as shown in FIG. 26 and improves machining accuracy.

Explained hereunder is an embodiment where the method of the present invention for improving response lag generated when said rotating direction reversed is adapted to the servo motor control of the closed loop control system where the speed loop is controlled digitally.

Figure 30:
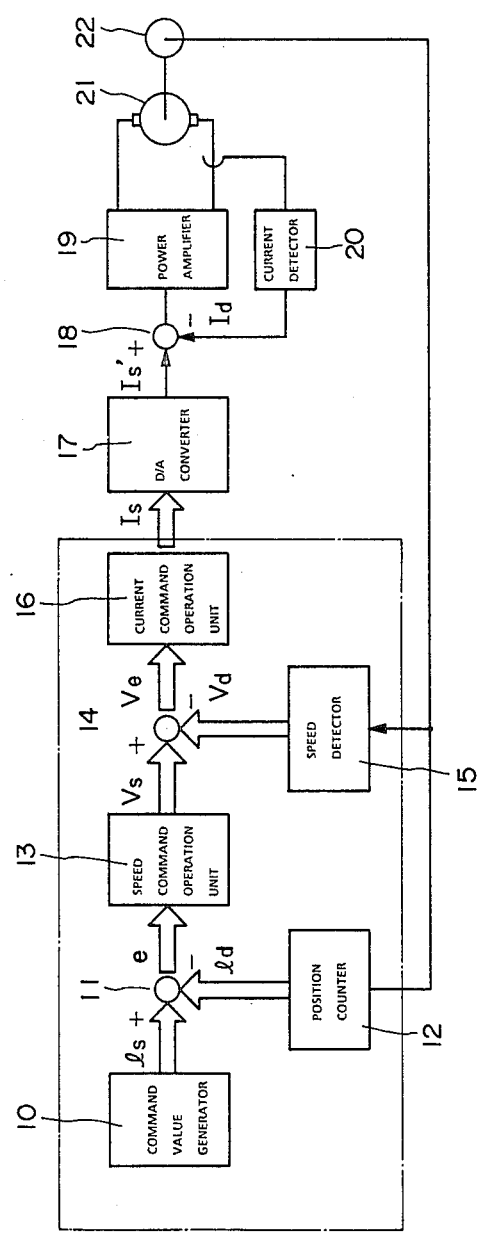
FIG. 30 is an ordinary control circuit diagram for digital control of a servo motor.

Generally, the servo motor control circuit, in which the speed loop is controlled digitally, having the position feedback loop, is provided, as shown for example in FIG. 30, with a speed feedback loop for controlling rotating speed of motor 21 and a current feedback loop for controlling a current of motor 21, in addition to said position feedback loop for controlling rotating position of motor 21 or position of movable part of machine (not shown). In the current feedback loop, control is made so that a motor current $I_d$ detected by a current detector 20 becomes equal to a motor current command value $I_s'$ in analog amount and the difference between a motor speed $V_d$ detected by a speed detector 15 and a speed command value $V_s$ sent from a speed command operation unit 13 becomes zero. Finally, the position of the motor is controlled by the position feedback loop so that the difference between the position $e_d$ detected by a position detector 22 such as pulse encoder or linear scale, etc. and a command value $e_s$ given from a command value generator 10 becomes zero. In FIG. 30, 12 is a position counter, 16 is a current command operation unit, 17 is a D/A converter, 19 is a power amplifier and 11, 14, 18 are subtractors.

The part enclosed by a broken line (dash-and-dot line) is digitally processed. The thick arrow mark ($\Rightarrow$) indicates a digital signal, while a thin arrow mark ($\rightarrow$) indicates an analog signal. In the speed command operation unit 13, arithmetic operation indidcated below is usually carried out.

$$\Delta V_s = K_p e \quad (K_p : \text{constant}) \tag{1}$$

While in the current command operation unit 16, following arithmetic operations are carried out in the current command operation unit 16.

$$I_{sp} = K_v V_e \quad (K_v \text{ is constant})$$

$$I_{sI} = K_I \Sigma V_e \quad (K_I \text{ is constant, } \Sigma \text{ is a symbol for calculating a sum}) \tag{2}$$

$$I_s = I_{sp} + I_{sI}$$

Figure 31:
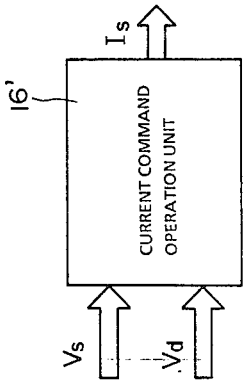
FIG. 31 is a block diagram where digital operation is realized with a hardware circuit.
Figure 33:
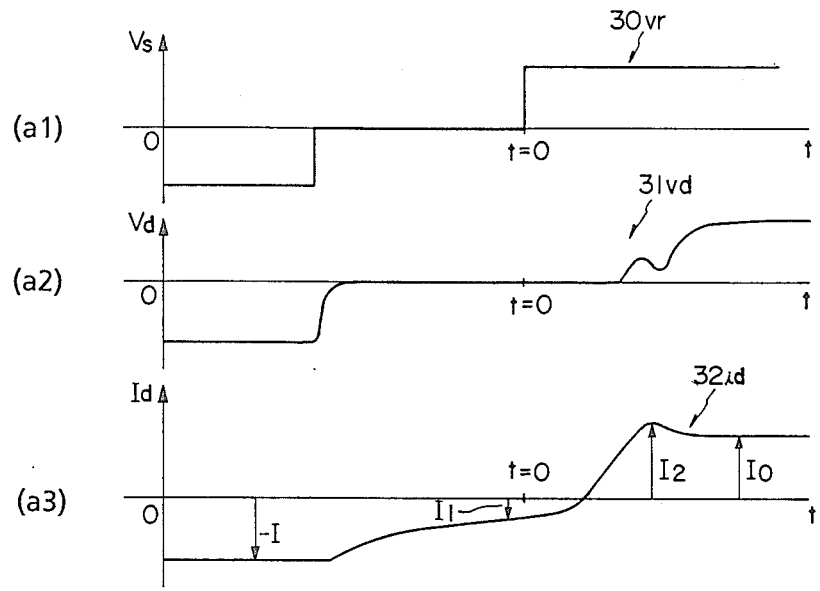
FIG. 33 shows waveforms indicating conventional control operations.
Figure 33:
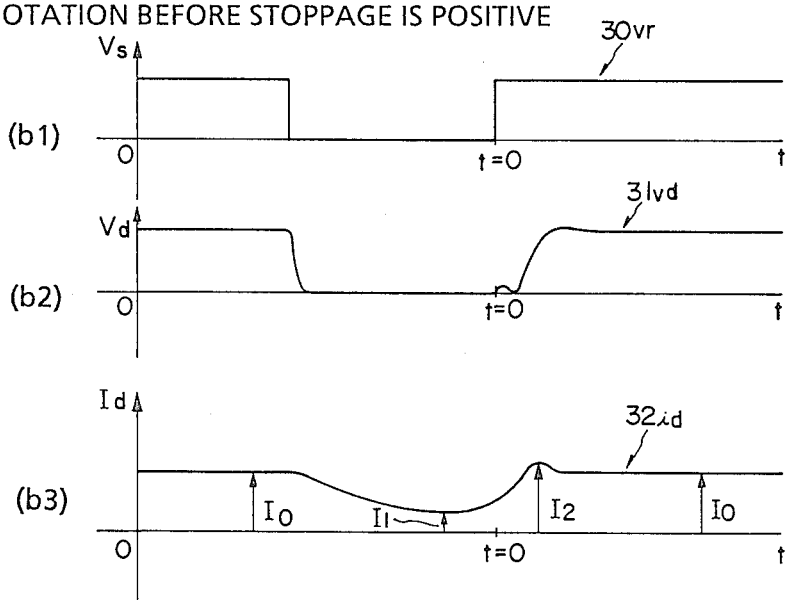

This current command operation system is the PI (proportional integral) control system. FIG. 31 shows a current command opertion unit 16' which determines relationship among speed command $V_s$, speed $V_d$ and current command $I_s$ in the I-P (integral-proportional) control system. Here, the current command opertion unit 16' carries out following arithmetic operations.

$$I_{sI} = K_I \Sigma (V_s - V_d)$$

$$I_{sp} = K_v V_d \tag{3}$$

$$I_s = I_{sI} - I_{sp}$$

Even in such a conventional servo motor control appartus having the structure explained above, a machining error also occurs as explained in the item of Background of the Invention.

As an improving measures for such problems, there is a method disclosed in the Japanese Patent Provisional Publication No. 57-71282 for the analog speed loop controller as described above but there are no any effective measures for solving such problems for the digital speed loop controller.

It is an object of the present invention to give a measure for solving such machining error for the digital speed loop controller.

A measure by the present invention will be explained hereunder with reference to the embodiments.

In case the arithmetic operations of (2),(3) are executed as the software program of microcomputer, it is enough to execute only once the arithmetic operations of (2) and (3) under the condition of $I_{sI} = -I_{sI}$ ($-$ indicates that 2's complement is taken) in such a moment that the speed command becomes zero.

Figure 32:
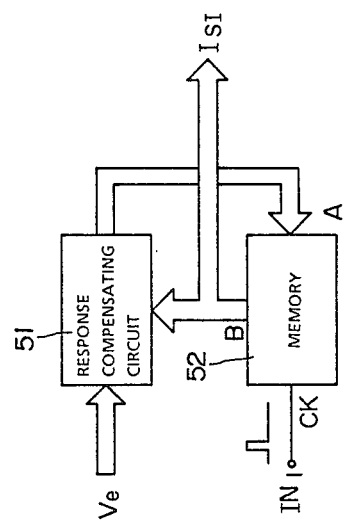
FIG. 32 is a block diagram illustrating a current command operation unit in the integral proportional control.

FIG. 32 shows an example where $I_{sI}$ in the equation (2) is realized in the hardware circuit. Here, 51 is an adder and 52 is a memory which latches an imput A at the rising edge of the signal input to the CK terminal and sends such value as the output B. IN$_1$ is responsive to a clock pulse for generating the timing of arithmetic operation and a pulse train signal having a constant period is usually input thereto.

Figure 13:
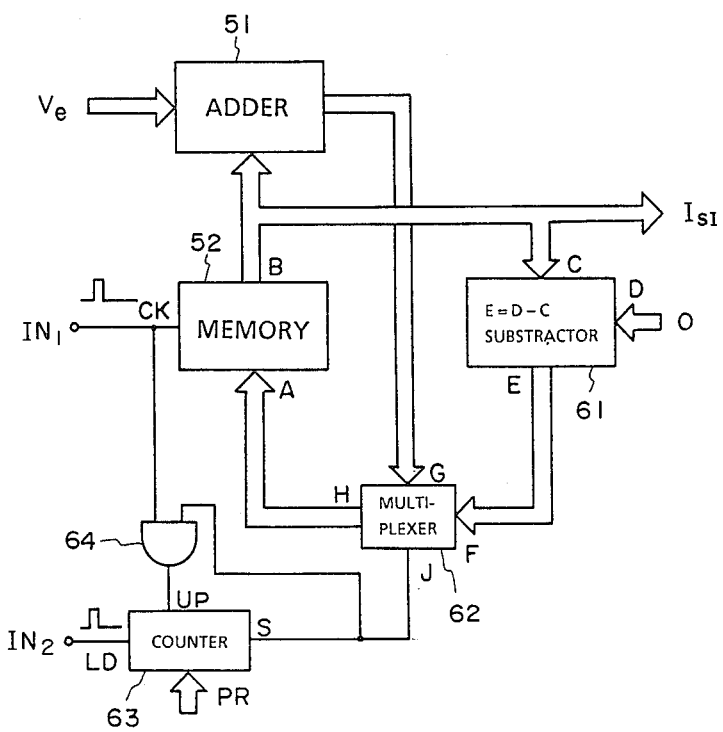
FIG. 13 is a block diagram illustrating an embodiment for achieving the second object of the present invention.

FIG. 13 shows an embodiment of the present invention. The elements given the like symbols as those of FIG. 32 have the like functions. In this figure, 61 is a subtractor which carries out the opertion of $E = D - C$. In this example, it is preset that $D = 0$. 62 is a multiplexer, where $H = F$ when the selection signal J is high or $H = G$ when J is low. 63 is a counter, where Up is a count-up pulse input terminal, LD is a load pulse input terminal, PR is a preset value input terminal and S is a counter sign bit. In this example, a preset value pR is set to $-1$ and $-1$ is set in the counter at the rising edge of pulse to be applied to In$_2$ (load signal input terminal).

When it is prescribed that a pulse signal which rises at the moment that the direction inversion command is issued from the command value generator is generated, the counter 63 is set to −1 by this signal, the sign bit S becomes high, the AND gate 64 opens and simultaneously the selection signal J of multiplexer 62 becomes high resulting in H=F. When a clock pulse is input to $IN_1$, F namely $-I_{SI}$ is latched by the memory 52, counting up the counter 63 to 0. Thereby, the sign bit S becomes low, closing the AND gate 64 and setting the selection signal J of multiplexer 62 to low level, resulting in H=G. Accordingly, only when the clock pulse is first applied to $IN_1$ after the direction inversion pulse signal is output, $-I_{SI}$ is obtained as the output of memory 52 and $I_{SI}+V_e$ is output in other cases, realizing the contents of the present invention.

In the case of equation (3), $V_s-V_d$ is input in place of $V_e$ of FIG.13 and the structure and function are realized in the same way.

If the motor rotating direction inversion signal cannot be obtained from the command value generator, the moment of polarity reversal of speed command $V_s$ is seized and equivalently used as the motor rotating direction inversion signal pulse.

In the case of the I-P-D control where $I_{sp}=K_vV_d+K_v'I_d$ ($K_v'$ is constant) considering a motor current value to for the equation (3), the contents of the present invention can also be realized in the same manner as the case of I-P control.

As explained above, the embodiment of the present invention shown in FIG. 13 generates a current command value which is equal in the absolute value and is opposed in polarity to a current command value at that time and momentarily compensates for a motor current corresponding a frictional torque at the moment that the motor rotating direction inversion signal pulse is input from the command function genertor. Thereby, the embodiment is capable of extraordinarily improving a lag of servo system by frictional torque. Accordingly, machining error as shown in FIG. 26 can be eliminated and the machining accuracy can also be improved by adopting the present invention to the servo motor control apparatus of the numerical control system.

The embodiment for achieving the third object of the present invention that the control accuracy is enhanced by reducing response lag of motor caused by a frictional torque when the motor rotating direction is reversed is explained hereunder.

Figure 14:
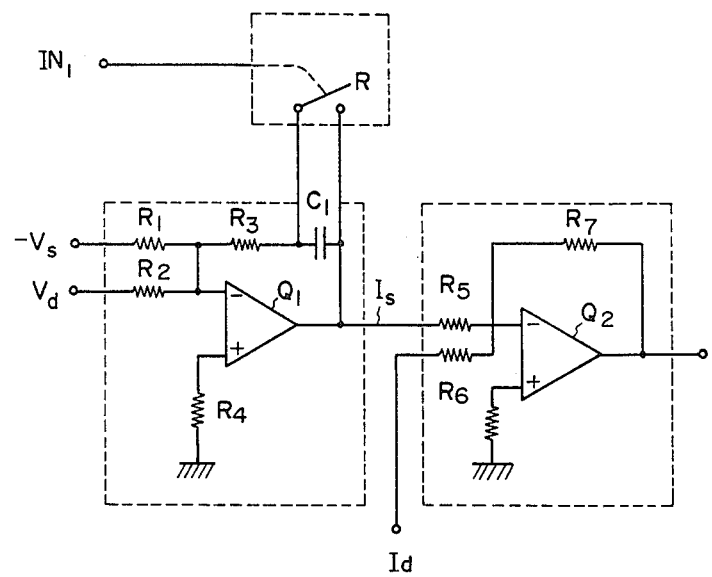
FIG. 14 is a circuit diagram of embodiment for achieving the third object of the present invention.

FIG. 14 is a circuit diagram illustrating a structure of an embodiment of the present invention. The same elements as those in FIG. 24 are given the same sysmbols. In FIG. 14, $IN_1$ is an input terminal to which the motor rotating direction inversion signal pulse is applied This embodiment is different from the conventional apparatus in that a relay R which turns ON and OFF with the direction inversion signal pulse $IN_1$ is provided.

Figure 15:
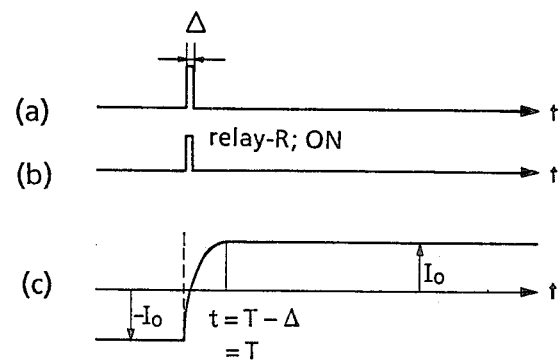
FIG. 15 shows operation waveforms.

FIG. 15 shows signal waveforms at each point in case the circuit shown in FIG. 14 is operated. Operations of the circuit shown in FIG. 14 are explained in detail with reference to the same figure.

When the direction inversion signal pulse having the width Δ as shown in FIG. 15(a) is generated from the command function generator, the integral capacitor $C_1$ discharges the accumulated charges when the relay R turns ON only for the time Δ and thereafter the relay R is turned OFF as shown in FIG. 15(b). When the motor reverses the rotating direction, namely when the direction inversion signal pulse rises, since both speed command $V_s$ and detected motor speed $V_d$ are zero, a current command $I_s$ which has been $-I_O$ before input of the direction inversion signal pulse becomes zero momentarily in synchronization with generation of the direction inversion signal pulse. As explained above, the time 2T has been required until the current command $I_s$ changes to $I_O$ from $-I_O$ but it can be curtailed up to T in the present invention and thereby delay of the servo system by frictional torque can be reduced to a half. Therefore, when the present invention is adapted to a servo motor control apparatus of the numerical control system, machining error as shown in FIG. 26 can be effectively reduced to a half only by adding one relay and turning ON and OFF such relay with the direction inversion signal.

Some applications or modifications are explained below. It is of course possible to use a transfer type analog switch inplace of a relay. Moreover, a switch which turns ON and OFF electrically for discharging a capacitor can also be used.

Short-circuit of integral capacitor means a proprotional control of speed loop, and it can be short-circuitted or not by switching the proportional control and proportional integral control. It is known that when an integral capacitor is saturated, a motor vibrates remarkably, and such control can also be mixed in parallel to the control system of short-circuitting the integral capacitor in order to stop such vibration.

If the motor direction inversion signal cannot be obtained from the command function generator, the moment of polarity reversal of speed command $V_s$ is seized and is equivalently used as the motor rotating direction inversion signal pulse.

As explained above, the embodiment of the present invention shown in FIG. 14 provides the effect of reducing a delay at the time of reversing rotating direction of motor to a half with only such a simple method that the integral capacitor of speed amplifier is short-circuitted at the moment that the motor rotating direction inversion signal pulse is input from the command function generator.

Next, the embodiment achieving the fourth object of the present invention that vibration and response lag of motor caused by frictional torque is compensated and control performance is enhanced when the motor starts the rotation and changes its rotating direction is explained hereunder.

Figure 16:
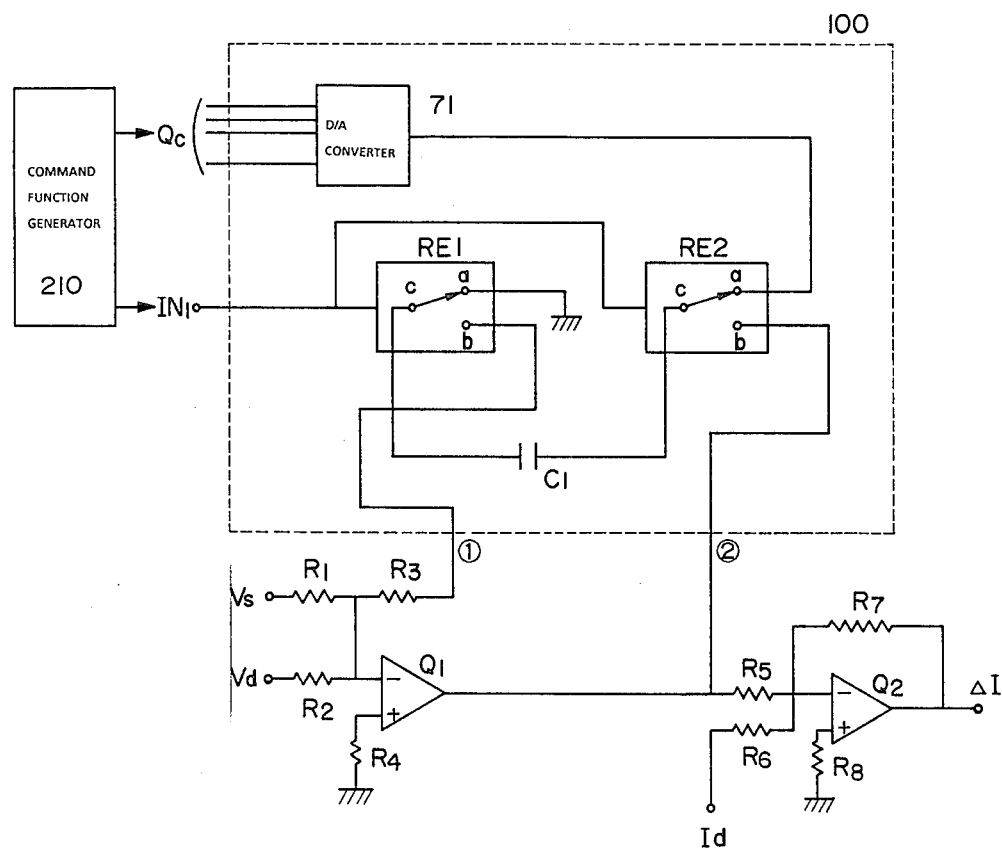
FIG. 16 is a circuit diagram of the embodiment for achieving the fourth object of the present invention.

FIG. 16 is a circuit diagram illustrating a structure of the embodiment of the present invention. The elements same as those in FIG. 14 are given the same symbols. $Q_c$ is a terminal for supplying charges corresponding to speed to the D/A converter 71 from the command function generator. $IN_1$ is an input terminal to which a signal pulse is applied when the motor starts to rotate and changes its rotating direction. $RE_1$, $RE_2$ are relays for transfer of contacts with the signal pulse sent from the terminal $In_1$.

The apparatus of this embodiment is different from the conventional apparatus shown in FIG. 14 only in that an integral capacitor charge circuit 100 is provided. The integral capacitor charge circuit 100 momentarily charges an integral capacitor when the motor rotation start signal or rotating direction inversion signal are output from the command function generator of the numerical control system.

Figure 17:
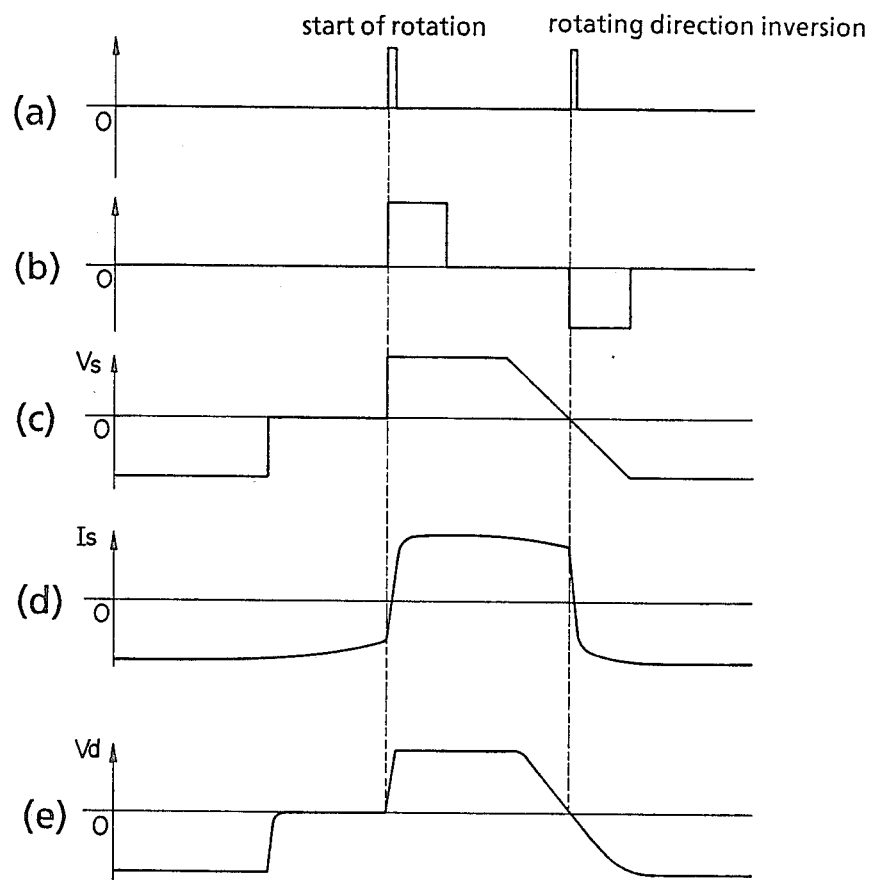
FIG. 17 shows operation waveforms.

FIG. 17 shows signal waveforms at respective points when the circuit shown in FIG. 16 is operated. Operations of the circuit shown in FIG. 16 are explained in detail with reference to the same figure.

When the motor rotation start signal pulse or rotating direction inversion signal pulse shown in FIG. 17(a) and a voltage corresponding to the charges for charging the integral capacitor $C_1$ shown in FIG. 17(b) are generated from the command function generator, the contacts of relays $RE_1$, $RE_2$ are connected to the side [a] and the integral capacitor $C_1$ is charged when the pulse (a) rises, while the contacts of relays $RE_1$, $RE_2$ are connected to the side [b], returning to the form of proportional integral control when the pulse (a) falls. When the motor starts to rotate and changes its rotating direction, since both speed command $V_s$ and detected motor speed $V_d$ are zero, a current command $I_s$ can be momentarily controlled as shown in FIG. 17(d). (c),(e) are respectively speed command value and motor speed.

As is obvious from above explanation, the present invention is capable of steeply improving a lag of servo system due to frictional torque and acceleration torque because a command voltage determining a current command value at that time can be set freely at the moment that the motor rotation start pulse and direction inversion pulse is input from the command function generator.

Figure 34:
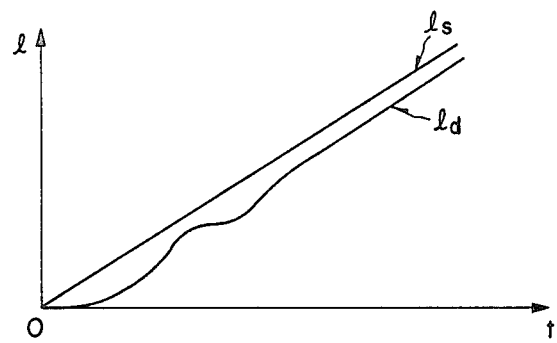
FIG. 34 is an explanatory view for illustrating tracking condition due to response lag.

Accordingly, vibration of motor at the time of starting rotation shown in FIG. 34 and machining error shown in FIG. 26 can be eliminated and improvement in machining accuracy and quick response of motor are effectively attained by adopting the present invention to the servo motor control appartus of the numerical control system.

Some applications and modifications are explained hereunder.

Figure 18:
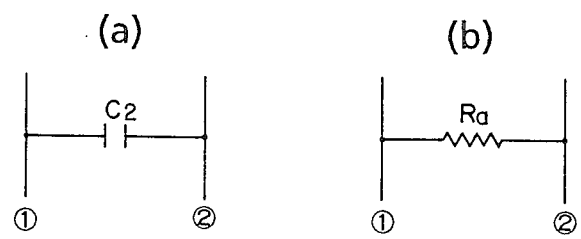
FIG. 18 is a circuit diagram for compensating for the open condition of the circuit shown in FIG. 16.

While the integral capacitor $C_1$ shown in FIG. 16 is charged, the terminals 1 and 2 become open and thereby there is a danger that an excessively high voltage is momentarily generated due to high open gain of an opertional amplifier $Q_1$. In view of eliminating such danger, it is possible to insert a capacitor $C_2$ (a) or a resistor $R_1$ (b) between the terminal 1 and 2 as shown in FIG. 18.

Figure 19:
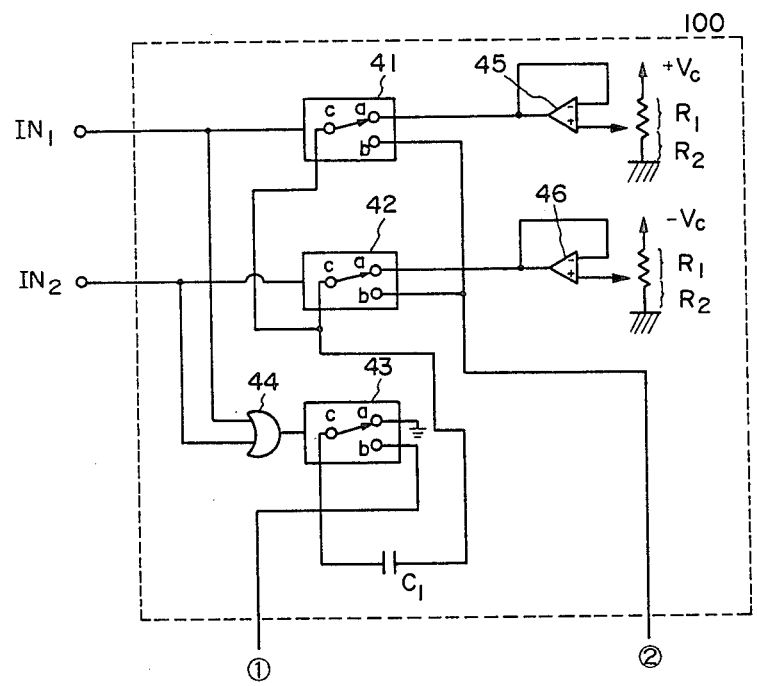
FIG. 19 and FIG. 20 are circuit diagrams of the other embodiment.

Next, an integral capacitor charge circuit 100 used in case a command voltage which detemines a current command value is set constant is shown in FIG. 19. In this figure, 41, 42, 43 are relays which operate as in the case of FIG. 16. 44 is an OR circuit. 45, 46 are operational amplifiers. Here, it is assumed that the signal pulse is input from the terminal $IN_1$. The contacts of relays 41, 43 are connected to the side [a], while contacts of relay 42 are connected to the side [b] when the signal pulse rises. Therefore, the capacitor $C_1$ charged up to $[R_1/(R_1+R_2)] V_c$ [Volt] by an output voltage of the operational amplifier 45. In the same way, when a signal pulse is imput from the terminal $IN_2$, the capacitor $C_1$ is charged up to $[(R_1/(R_1+R_2)]V_c$ [Volt] when the signal rises. When the signal pulse falls, contacts of relays 41, 42, 43 are all connected to the side [b], returning to the form of proportional integral control.

Switching by relay may be replaced with an electronic switching by a variety of analog switches.

Figure 20:
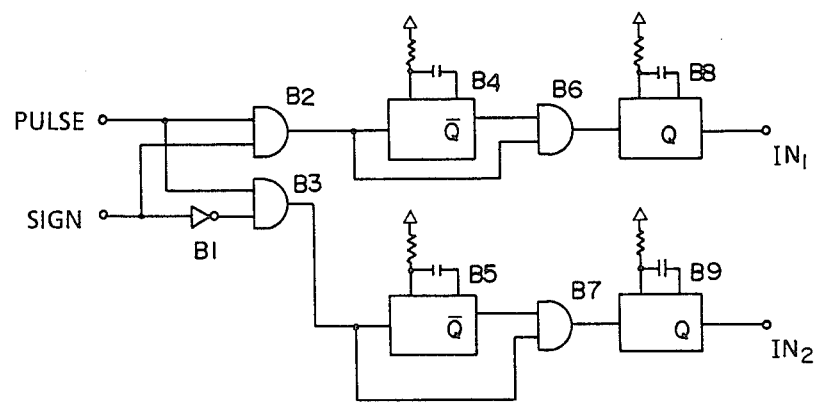

In case the motor rotation start signal and rotating direction inversion signal cannot be obtained from the command generator, the moment when speed command $V_s$ changes to a value from zero or the moment of polarity inversion are seized from the speed command signal pulse and the speed command direction with the circuit shown in FIG. 20 to preferably and equivalently use as the motor rotation start and rotating direction inversion signal pulses. $B_1$ is an inversion circuit. $B_2$, $B_3$, $B_6$, $B_7$ are AND circuits. $B_4$, $B_5$ are retriggerable monostable multi-vibrators. $B_8$, $B_9$ are monostable multi-vibrators. PULSE is a speed command signal pulse. SIGN is an input terminal of speed command direction. $In_1$, $In_2$ are output terminals of signal pulses when the motor starts rotation in the positive or negative direction and the motor changes its rotating direction.

As explained above, the embodiments of the present invention shown in FIG. 16–FIG. 20 provided the effect that control accuracy can be enhanced by compensating for vibration and response lag of motor caused by frictional torque and acceleration torque when the motor starts rotation and changes its rotating direction.

Next, an embodiment achieving the fifth object of the present invention that a method for compensating for vibration and response lag of motor caused by frictional torque when the motor starts rotation or changes its rotating direction is adapted to the digital speed loop is explained hereunder.

Figure 22:
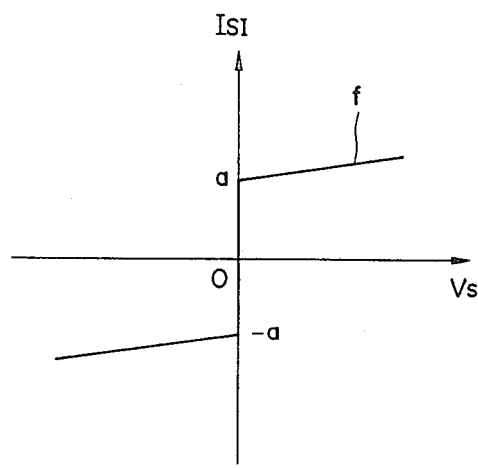
FIG. 22 is a graph illustrating relationship between the speed command and current command in FIG. 21.
Figure 23:
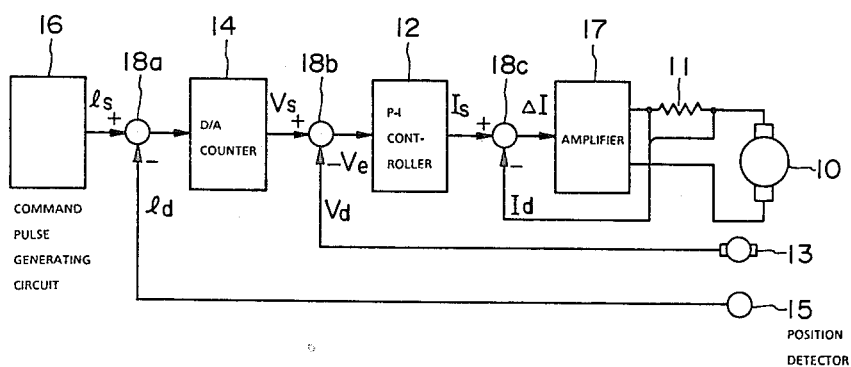
FIG. 23 is a block diagram of a servo motor control apparatus having an ordinary position feedback loop.

First, in case the arithmetic operations of equations (2), (3) are executed as the software program of microcomputer, the arithmetic operations (2), (3) are once carried out with the condition of $I_{SI}=f(V_s)$ for start of rotation or for inversion of rotating direction at the moment that the speed command becomes zero. Here, f is a function of speed command $V_s$ and can be indicated, for example, as shown in FIG. 22. In this figure, {a} is a value of Coulomb friction compensation.

Figure 21:
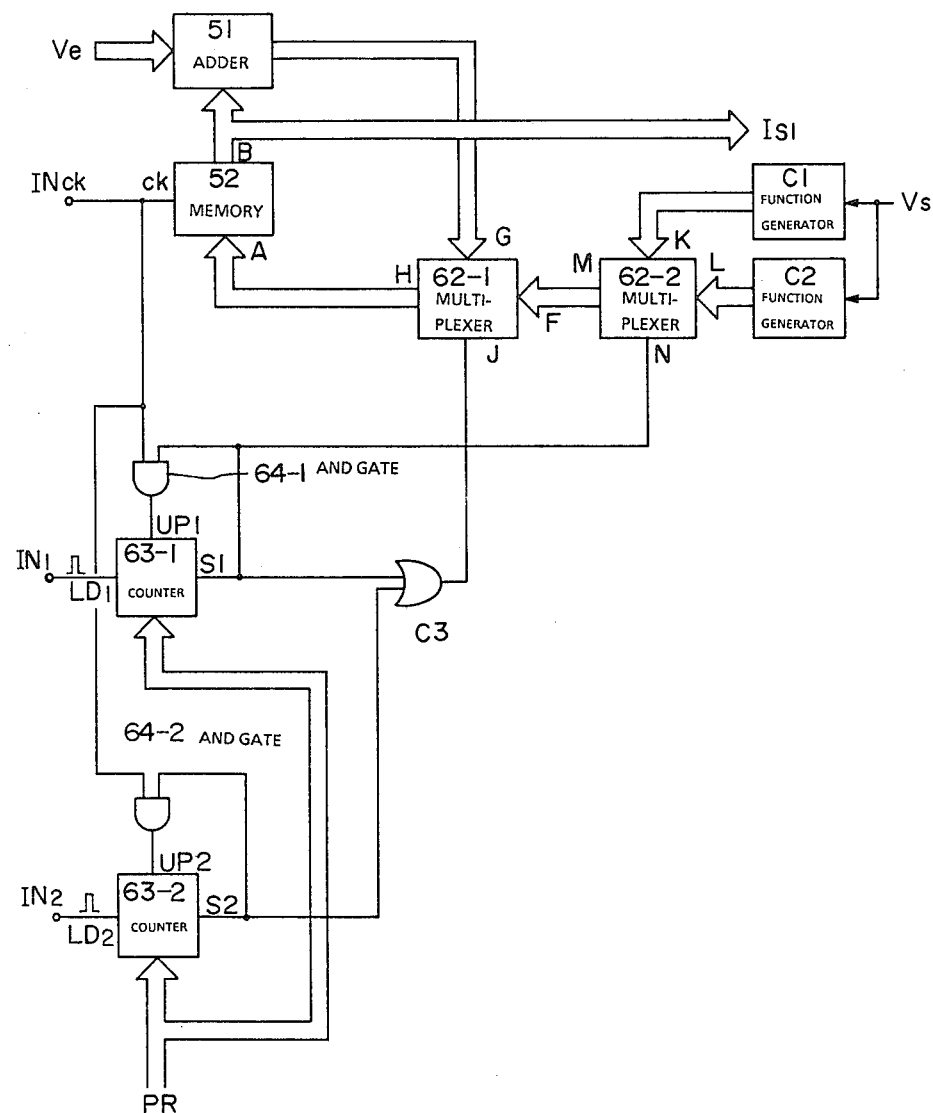
FIG. 21 is a block diagram of the embodiment for achieving the fifth object of the present invention.

FIG. 21 shows an example where $I_{SI}$ of equation (2) is realized with a hardware circuit. In this figure, the same elements as those in FIG. 13 are given the same functions. C1, C2 are function generators which respectively determine the integral items of speed loop as the functions fo speed command Vs when the motor starts rotation or changes its rotating direction. C3 is an OR gate which generates logical sum of the sign bits S1, S2 of counters 63-1, 63-2.

When it is assumed that the pulse signal which rises at the moment that the operation start command is issued from the command value generator is applied to $In_1$, this signal sets the counter 63-1 to $-1$ and the sign bit S1 to high level and opens the AND gate 64-1. The same process can also be adopted to the operation start signal. When operation starts with the sign bit S1, the selection signal N of the multiplexer 62-2 becomes high, resulting in M=K. When the direction is reversed, the selection signal N becomes low, resulting in M=L. When any one of the opertion start command or direction inversion command is issured, the signal issued opens the OR gate C3 and sets the selection signal J of multiplexer 62-1 to high level, resulting in H=F. When a clock pulse is input to $In_{CK}$, F, namely a command corresponding to the speed command $V_s$ is latched in the memory 52 and a corresponding counter among those 63-1, 63-2 counts up to zero. Thereby, the sign bit S1 becomes low, the AND gate 64-1 or 64-2 closes and the selection signal J of multiplexer 62-1 becomes low, resulting in H=G. Therefore, only when the clock pulse is first applied to $In_{CK}$ after the opertion start pulse signal or direction inversion pulse signal is generated, the speed command $V_s$ and a command corresponding to the operation start command or direction inversion command are output. In other cases, $I_{SI}+V_e$ is output and thereby content of the present invention can be realized.

In the case of equation (3), $V_s-V_d$ is input in place of $V_e$ of FIG. 21 and therefore the structure and function can also be realized in the same way.

If the motor rotating direction inversion signal cannot be obtained from the command value generator, the moment of polarity reversal of speed command $V_s$ is preferably seized to equivalently use as the motor rotating direction inversion signal pulse.

In the case of I-P-D control of $I_{sp}=K_v V_d + K_v' I_d$ ($K_v'$ is a constant) considering a motor current value to the equation (3), the object of the present invention can also be realized in the same way as the I-P control.

As explained above, the embodiment of the present invention shown in FIG. 21 can remarkably improve the lag of servo system due to frictional torque because an integral item of controller is set to a value having the polarity and amplitude corresponding to the speed command at the moment that the motor operation start of the direction inversion signal is input and a motor current corresponding to frictional torque is momentarily compensated.

Industrial Applicability

The present invention can be applied in various fields where high resolution is required for servo mechanism such as machining by sophisticated machinery, manufacturing of semiconductor devices and machining for non-spherical surface lenses.

What is claimed is:

1. A method for controlling a servo motor control apparatus having a position feedback control loop, a speed feedback control loop, a motor current feedback loop, controller means which include at least a proportional element and an integrating element within said speed feedback loop, and means for producing a speed command voltage responsive to the motor speed;

said method comprising setting a value of said integrating element of said controller means to zero or reversing its polarity at the moment that said speed command of the motor becomes negative or positive after passing through zero.

2. A servo motor control method according to claim 1 wherein said integrating element comprises a capacitor, comprising reversing the connections of said integrating capacitor at the moment that the polarity of the speed command voltage is reversed.

3. A servo motor control method according to claim 1 wherein said speed feedback control loop comprises said controller means and is comprised of a digital logical circuit or microcomputer, comprising reversing the polarity of the integrating element of said controller means while keeping its absolute value constant at the moment that the polarity of said speed command voltage reverses.

4. A servo motor control method according to claim 1 wherein said integrating element comprises a capacitor, comprising discharging said capacitor at the moment that the polarity of said speed command voltage reverses.

5. A method for controlling servo motor control apparatus having a position feedback control loop, a speed feedback control loop, a motor current feedback loop, a controller circuit which includes at least a proportional element and an integrating element within said speed feedback loop, means producing a speed command voltage responsive to the motor speed, and command function generator means for producing a command or direction inversion command signal, said method comprising using an integrating capacitor for said integrating element, disconnecting said integrating capacitor from said circuit, then charging said integrating capacitor with a charge having a polarity and amplitude corresponding to said command voltage, and then reconnecting it to said circuit at the moment that the opertion start command or direction inversion command is output from said command function generator.

6. A servo motor control method according to claim 5 wherein the controller circuit is comprised of a digital logic circuit or microcomputer, comprising setting the integrating element of said controller circuit to a value having a polarity and amplitude corresponding to said speed command voltage at the moment that the speed command voltage changes to positive or negative from zero, becomes positive from negative or becomes negative from positive.

7. In a servo motor control apparatus comprising a position feedback control loop, a speed feedback control loop, a motor current feedback loop, a controller circuit within said speed control loop, said controller circuit comprising at least a proportional element and an integrating capacitor, and means producing a speed command voltage responsive to motor speed, the improvement comprising a capacitor reversing circuit for connecting the integrating capacitor, said reversing circuit comprising switching elements connected to both ends of the integrating capacitor, said switching elements being connected to reverse the connections of said integrating capacitor at the moment that the polaity of the speed command voltage reverse.

8. In a servo motor control appartus comprising a position feedback control loop, a speed feedback control loop, a motor current feedback loop, a controller circuit within said speed control loop, said controller circuit comprising at least a proportional element and an integrating element, and means producing a speed command voltage responsive to motor speed, the improvement wherein the controller circuit is comprised of a digital logic circuit or microcomputer, said integrating element comprises an adder and a memory, and further comprising means for reversing the sign of a stored value in said memeory means at the moment that the polarity of said speed command votlage reverses.

9. In a servo motor control apparatus comprising a position feedback control loop, a speed feedback contol loop, a motor current feedback loop, a controller circuit within said speed control loop, said controller circuit comprising at least a proportinal element and an integrating capacitor, means producing a speed command voltage responsive to motor speed, the improvement comprising contact terminals of the normally-open contacts of switching element connected to both ends of said integrating capacitor, a switching means for closing the normallyopen contacts at the moment that a polarity of speed command voltage reverses to thereby discharge said integrating capacitor.

10. In a servo motor contol apparatus comprising a position feedback control loop, a speed feedback control loop, a motor current feedback loop, a controller circuit within said speed contol loop, said controller circuit comprising at least a proportional element and an integrating capacitor, means producing a motor rotation start command pulse, a rotation direction reversing pulse and a speed command value, the improvement comprising a switching element connected to both ends of said integrating capacitor, means separating said integrating capacitor from said controller circuit by operating said switching element in response to said motor rotation start command pulse or rotating direction reversing pulse at the moment that the speed of the motor decreases to almost zero to charge said integrating capacitor to an amount corresponding to the speed command value and to connect said integrating capacitor to said controller circuit after the charging thereof.

11. In a servo motor control apparatus comprising a position feedback control loop, a speed feedback control loop, a motor current feedback loop, a controller circuit within said speed control loop, said controller circuit comprising at least a proportional element and an integrating element, means producing a speed command, and means producing a speed command voltage responsive to motor speed, the improvement wherein said controller circuit is comprised of a digital logic circuit or microcomputer, and further comprises a memory and an adder, said memory comprising said integrating element, means for storing an integrating value in said memory, and means for setting said integrating value to an amount having a polarity and amplitude corresponding to said speed command voltage at the moment that the speed command reverses to positive or negative value from zero or to a positive or negative value through zero.

* * * * *